June 18, 1935.  A. H. HERR  2,005,189
SOLDER COUPLING
Filed July 10, 1933
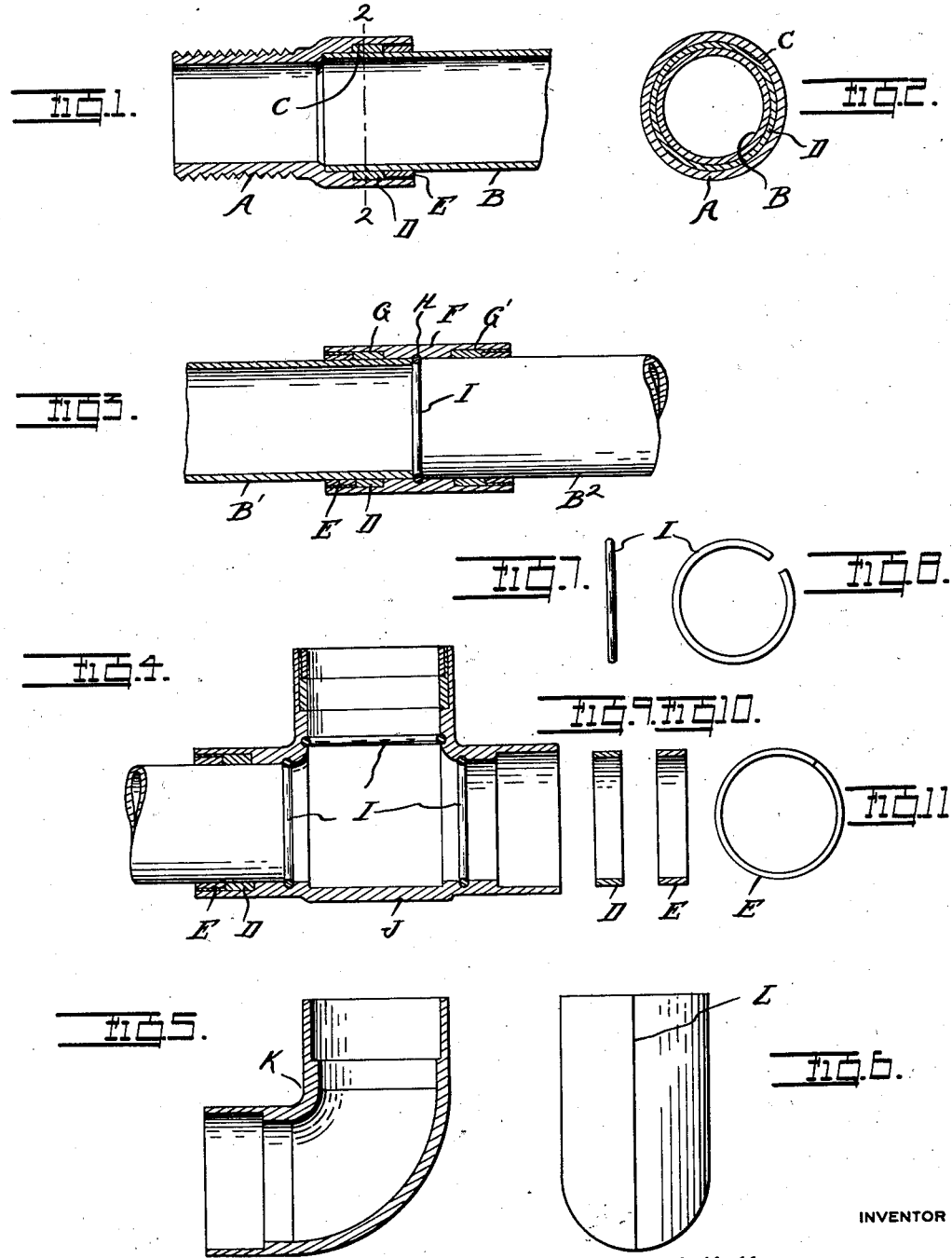
INVENTOR
Albert H. Herr
BY Whittemore Hulbert Whittemore
+ Belknap  ATTORNEYS Patented June 18, 1935

2,005,189

UNITED STATES PATENT OFFICE 2,005,189

SOLDER COUPLING

Albert H. Herr, Port Huron, Mich.

Application July 10, 1933, Serial No. 679,765

6 Claims. (Cl. 285—115)

The invention relates to solder coupling more particularly adapted for use in connecting and sealing pipe fittings but also useful for other applications, as for instance the joining of electrical conductors. It is the object of the invention to obtain a simple construction of coupling; further, to simplify the operation of forming the solder joint and also to insure a perfect union and seal. With these and other objects in view the invention consists in the construction and method as hereinafter set forth.

In the drawing:

Fig. 1 is a longitudinal section through a coupling of my improved construction;

Fig. 2 is a cross section thereof on line 2—2 of Fig. 1;

Fig. 3 is a view similar to Fig. 1 showing a modified construction;

Fig. 4 is a view showing the application of the joint to a T-fitting;

Fig. 5 is a sectional view of an elbow fitting;

Fig. 6 is an end elevation thereof;

Fig. 7 is an end elevation and Fig. 8 a side elevation of the snap ring;

Fig. 9 is a cross section of the solder ring;

Fig. 10 is a cross section of the retaining ring, and

Fig. 11 is an elevation of Figs. 9 and 10.

As illustrated in Figure 1, A is a fitting which may be formed of any suitable material but preferably of copper, brass or even lead; B is a pipe section telescopically engaging the end of the fitting A; C is a counterbore in the fitting A surrounding a portion of the pipe B; D is a ring of solder which is of dimensions to externally fit within the counterbore and internally to sleeve upon the pipe B. This ring is placed at the inner end of the counterbore and is retained in position by a ring E of less fusible material such, for instance, as brass. With the construction as thus far described, to form a seal joint between the fitting A and pipe B, it is only necessary to sleeve the rings D and E upon the pipe B to telescopically engage said pipe with the fitting A and to then heat the parts to a temperature above the fusing point of solder. Prior to the engagement of these parts, the contacting surfaces may be coated with a suitable flux so that when the parts are heated, the fused solder will adhere to all contacting surfaces. It will also pass by capillary action between the outer and inner surfaces of the ring E and will adhere at the end of said ring, thereby giving visible evidence that the soldering has been accomplished.

As shown in Figure 3, two pipe sections B' and B² are engaged with a union fitting F which latter is counterbored at its opposite ends as indicated at G and G'. The solder rings D and retaining rings E are placed in this counterbore in the same manner as described for Figure 1, and the soldering is effected in the same way. However, to insure that the pipes B' and B² are properly positioned within the fitting F, the latter is provided with a central internal groove H in which a snap ring I is placed thus forming a stop or abutment for the ends of the pipes B' and B².

As shown in Figure 4, the fitting J in the form of a T is provided with grooves for receiving stop rings I for each of its nipples, and the latter are counterbored as indicated for the reception of the solder rings D and retainer rings E. Figure 5 shows an elbow fitting K which is similar in the formation of counterbores for receiving the solder and retainer rings, but which is made of pressed sheet metal half sections brazed or otherwise secured to each other along the line L.

The solder rings may be either split rings formed from a strip of solder of proper thickness or they may be formed as continuous rings severed from tubes or drawn from a solder sheet. In whatever way they may be formed, the completed ring should quite closely fit the contacting parts so that when fused, the entire cavity will be filled with solder with a slight excess passing by capillary action between the retaining ring and the fitting. Thus, as previously stated, when the solder is fused, it will become visible at the end of the fitting.

In machining pipe fittings of the construction shown in Figures 3 and 4, the drill can be passed completely through the fitting to form the surface for telescopically engaging the pipes. This simplifies the construction over constructions in which the stop for the end of the pipe is integral with the fitting and which, therefore, limits the distance that the drill may be inserted. A further advantage of this construction is that by using a removable snap ring, the fitting may be engaged with pipes which have already been installed. For instance, if there is a defect in a pipe at one point, a section of this pipe may be cut out and then by springing the remaining portions slightly out of alignment, a fitting may be telescoped over one end and then drawn back to engage the other end. This would not be possible if the stop were a permanent part of the fitting.

My improved construction may also be used without the preforming of the soldering rings and retainers as the workman on the job may cut these rings out of strips of metal and proceed with the forming of the joint as previously described.

It is also within the scope of my invention to make a brazed coupling instead of a soldered coupling. In such a joint the fittings are preferably made of iron pipe and the ring E is also made of a ferrous material. The fusible ring D is made of brass, bronze or other suitable brazing material. The parts to be brazed are first cleaned and treated with boric acid or other suitable flux. The brazing ring D is then inserted, followed by the steel ring E. Heat may be applied by means of an external flame or by electric brazing or any other suitable means. This results in the melting of the brazing material which flows outward by capillarity and forms a sealing joint upon cooling.

In all of the constructions as previously described, it is desirable that the telescoping parts have a close fit so as to facilitate the formation of a good seal. The drawing is somewhat exaggerated in order to represent the sealing bond in the finished joint.

What I claim as my invention is:

1. A coupling comprising two telescopically engaged members, one cut away to form an open ended annular recess between the same and the other member, a ring of fusible metal insertable in said recess and occupying the inner portion thereof, and a ring of less fusible metal insertable into the outer portion of said recess and forming a retainer for said inner ring.

2. A coupling comprising two telescopically engaged members, the outer member having a counterbore forming an open ended annular recess surrounding the inner member, a ring of fusible metal insertable in said counterbore and filling the inner portion thereof, a ring of less fusible metal insertable in said counterbore and filling the outer portion thereof whereby upon heating said members to the fusing point of said fusible member the crevices between said retaining member and the walls of the recess will be filled by capillarity.

3. A coupling comprising two telescopically engaged cylindrical members, the outer member being provided with a counterbore for forming an open ended annular recess between the same and the inner member, a ring of fusible solder sleeved upon said inner member and insertable in said counterbore to fill the inner portion thereof, a ring of less fusible metal sleeved upon said inner member and inserted in the outer portion of said counterbore, the adjacent surfaces of said members being fluxed whereby on the heating of said members to the fusing point of said fusible solder the latter will adhere to all contacting surfaces and will fill by capillarity the crevices between said retaining ring and the adjacent members.

4. A coupling comprising a cylindrical sleeve having a portion of one diameter for telescopically engaging an inner cylindrical member and another portion of greater diameter for forming an open ended annular recess between the same and said inner cylindrical member, a ring of fusible solder of an inner diameter to fit around said inner cylindrical member and of an outer diameter to fit the recess in said sleeve, said ring being inserted in said recess to fill the inner portion thereof, and a second ring of less fusible metal filling the outer portion of said recess and retaining said inner ring whereby upon the heating of said members to the fusing point of said solder the joint between said members will be effectively sealed.

5. A coupling comprising a cylindrical sleeve having a portion of one diameter for telescopically engaging an inner cylindrical member and another portion of greater diameter forming an open ended annular recess between the same and said inner cylindrical member, an annular groove in a portion of said sleeve of smallest diameter, a snap ring engaging said groove and forming a stop for limiting the inward telescopic movement of said inner member, a ring of fusible solder of dimensions to fit and fill the inner portion of said recess, and a second ring of less fusible metal filling the outer portion of said recess whereby upon the heating of said members to the fusing point of said fusible solder the joint will be sealed.

6. A coupling comprising two telescopically engaged cylindrical members, one being cut away to form an open ended annular recess between the same and the other member of uniform radial depth, a strip of fusible solder of a thickness corresponding to the radial depth of said recess, said strip being fashioned to form a ring for filling the inner portion of said recess and a similarly formed strip of less fusible metal filling the outer portion of said recess.

ALBERT H. HERR.